US005970614A

United States Patent [19]

Adachi et al.

[11] Patent Number: 5,970,614

[45] Date of Patent: Oct. 26, 1999

[54] METHOD FOR FORMING VALVE SEATS

[75] Inventors: Shuhei Adachi; Junkichi Amano; Hiroyuki Sakai, all of Iwata, Japan

[73] Assignee: Yamaha Hatsudoki Kabushiki Kaisha, Iwata, Japan

[21] Appl. No.: 08/646,984

[22] Filed: May 8, 1996

[30] Foreign Application Priority Data

May 8, 1995 [JP] Japan .................................... 7-109727

[51] Int. Cl.[6] ...................................................... B23P 15/00

[52] U.S. Cl. .................................... 29/888.44; 29/888.061

[58] Field of Search ........................ 123/188.8; 29/888.4, 29/888.44, 888.06, 888.061, 214, 890.122, 890.124, 451, 453

[56] References Cited

U.S. PATENT DOCUMENTS

| | | | |
|---|---|---|---|
| 1,795,433 | 3/1931 | Leipert | 29/888.06 |
| 1,999,434 | 4/1935 | Albertson | 29/888.44 |
| 2,174,337 | 9/1939 | Welsmiller et al. | 29/888.44 |
| 3,728,940 | 4/1973 | Peterson . | |
| 4,896,638 | 1/1990 | Shepley . | |
| 5,649,358 | 7/1997 | Adachi et al. | 29/888.4 |

FOREIGN PATENT DOCUMENTS

| | | | |
|---|---|---|---|
| 2694788 | 2/1994 | France . | |
| 4036614 | 5/1991 | Germany . | |
| 6-58116 | 3/1994 | Japan | 29/888.44 |

OTHER PUBLICATIONS

Patent Abstracts of Japan, vol. 012, No.381 (M–752) Oct. 12, 1988 & Jp–A–63 131853.

Patent Abstracts of Japan, vol. 96, No. 001 & JP–A–08 004581.

Patent Abstracts of Japan, vol. 010, No. 246 (M–510), Aug. 23, 1986 & Jp–A–61 076742.

European Search Report dated Oct. 1996.

*Primary Examiner*—Erick R. Solis
*Attorney, Agent, or Firm*—Knobbe, Martens, Olson & Bear LLP

[57] ABSTRACT

A method of forming cylinder heads having bonded valve seat inserts. The method reduces the machining operations necessary to place the insert in place by forming the cylinder head casting with reference surfaces that are employed for determining the pressing axis and location for the valve seat insert.

12 Claims, 14 Drawing Sheets

METHOD FOR FORMING VALVE SEATS

BACKGROUND OF THE INVENTION

This invention relates to a valve seat arrangement for a reciprocating machine and more particularly to an improved method of forming a bonded valve seat for an internal combustion engine.

In internal combustion engines, it frequently is the practice to employ aluminum or aluminum alloys as the material for a number of the major engine castings such as the cylinder heads. When the cylinder heads are formed from aluminum or aluminum alloys, however, certain components of the cylinder head are formed from a dissimilar material so as to improve performance. For example, the valve seats of the cylinder head are normally formed from a harder, less heat conductive material such as iron or ferrous iron alloys. By utilizing such harder materials, the valve seat life can be extended. However, the attachment of the dissimilar valve seat insert into the cylinder head presents a number of problems.

Conventionally, it has been the practice to form the cylinder head passages with recesses adjacent the seating area into which the insert rings which form the valve seat are press fit. The use of press fitting has a number of disadvantages. These disadvantages may be understood by reference to FIG. 1 which shows a conventional pressed in type of valve seat.

The cylinder head material 21 is formed with a counterbore 22 at the cylinder head recess side of the flow passage 23. The flow passage 23 may be either an intake passage or an exhaust passage. The insert ring is indicated by the reference numeral 24 and may be formed from any suitable material, such as a Sintered ferrous material. Such materials have the advantage of having high wear capabilities. After the insert 24 has been pressed into place, its surface is machined as at 25 so as to form the actual valve seating surface.

As may be seen, this technique requires relatively large valve seat inserts in order to withstand the pressing pressures. In addition, the press fit must be such that the insert ring will not fall out when the engine is running. As a result, there are quite high stresses exerted both on the cylinder head and on the insert ring. The stresses can result in loads which may eventually cause cracks in the cylinder head.

These types of construction also limit the maximum size and spacing of the valve seats in order to ensure adequate cylinder head material between adjacent valve seats to reduce the likelihood of cracking. In addition, the large seats compromise the configuration of the intake passages, particularly at the critical valve seating area. Finally, these constructions result in somewhat poor heat transfer from the valve to the cylinder head due to the poor thermal conductivity of the valve seat material and the poor contact area between the insert 24 and the cylinder head 21.

In addition, the interface between the insert ring and the cylinder head frequently leaves voids or air gaps which further reduce the heat transfer and thus cause the valves to run at a higher temperature. This higher temperature operation of the valves requires the valves to be made heavier and stronger and thus reduce the performance of the engine and increase its size and costs.

Many of these problems become worse as the engine reaches operating or higher temperatures. Because of the higher coefficient of expansion of the cylinder head material, the press fit force diminishes and the contact area for heat transfer also decreases.

In addition to these problems which deal primarily with the ultimate performance of the resulting cylinder head and associated engine, there are certain additional manufacturing disadvantages with the pressed-in type of insert. These have to do with the cost and the complicated manufacturing process by which the pressed-in inserts are formed.

As has been previously noted, the insert ring is press-fit into a bore or counterbore 22 which is machined on the cylinder head recess side of the flow passage 23. Because of the techniques which are employed, the positioning and formation of this bore must be done very accurately so as to ensure that the resulting valve seat will be appropriately positioned so that it will cooperate with the associated poppet valve. Thus, a machining operation has been required to accurately form the valve seat receiving counterbore 22. In addition and frequently at the same time, the bore in the cylinder head which receives the respective valve guide also is machined.

Furthermore, to accommodate both the pressing of the valve seat insert and of the valve guide, separate heating steps are required for heating the cylinder head and/or cooling the valve seat insert and the valve guide so as to facilitate installation.

The machining operations require a cleaning operation before the subsequent heating so as to ensure that particles will not be present in the cylinder head that can interfere with the subsequent press-fitting. Thus, the prior art methods are not only expensive but also time-consuming. In addition to resulting in a cylinder head that has less than optimum performance.

To overcome the disadvantages in the performance of the cylinder heads having pressed in inserts it has been proposed, therefore, to employ a technique wherein the insert ring is metallurgically bonded but not alloyed to the cylinder head material. This is accomplished by pressing the insert into place and passing an electrical current through the insert which is sufficient to cause the cylinder head material to plastically deform upon insertion of the insert ring. The plastically deformed phase of the cylinder head material forms a metallurgical bond at the interface with the insert ring without any significant resulting alloying of the cylinder head material to that of the insert ring. Such an arrangement is disclosed in our copending application entitled, "Valve Seat Bonded Cylinder Head and Method for Producing Same," application Ser. No., 08/483,246, filed Jun. 7, 1995 and assigned to the assignee hereof. In addition, certain of these techniques are also described in our copending application entitled "VALVE SEAT," application Ser. No. 08/278,026, filed Jul. 20, 1994, in our names and also assigned to the Assignee hereof.

These techniques have a number of advantages over the conventional structures. First, they permit the use of much smaller insert rings since the pressing pressure is reduced and thus the shape of the intake passage, particularly the shape of the cylinder head passages, particularly in the critical area of the valve seats are not compromised. In addition, the bond strength is considerably higher than more conventional methods. Furthermore, this technique, because of the improved way in which the adhesion is formed, permits the use of much smaller insert rings and thus permits the valve seat openings to be positioned closer to each other without the likelihood of causing defects in the cylinder head which may manifest themselves during the engine running and life.

Therefore it is an object of this invention to provide a further improved method for bonding such valve seat inserts into place.

It is a further object of this invention to provide a further improved method for bonding such valve seat inserts into place that minimizes the machining and other steps required to form the valve seat.

SUMMARY OF THE INVENTION

This invention is adapted to be embodied in a method of forming a valve seat for a cylinder head having a flow passage ending in a combustion chamber recess. The method comprising the steps of casting a cylinder head having a flow passage. The cast cylinder head is formed with reference surfaces used to establish three mutually perpendicular reference axes that intersect at a common point. A recess is formed at the combustion chamber side of the flow passage. An insert is formed to be received in the recess. The insert has an opening adapted to form a flow opening registering with the cylinder head flow passage and an outer surface positioned to engage the part of the cylinder head defining the recess. The insert is then placed in alignment with the recess. Pressure is then applied to the cylinder head and the insert along an axis defined by the reference axes. An electrical current is passed through the insert and the cylinder head during at least a portion of the pressing operation to heat the cylinder head and form a metallurgical bond between the cylinder head and the insert.

DETAILED DESCRIPTION OF THE PREFERRED EMBODIMENTS

It should be noted that the actual mechanical way in which the bond is formed with the valve seat is as described in the aforenoted co-pending applications, the disclosures of which are incorporated herein by reference. Even though these disclosures are incorporated herein by reference and the invention in this application deals primarily with the pressing method, a general description of the bonding process will also be included. However, where further information is required, reference may be had to the aforenoted co-pending applications.

Figure 1:
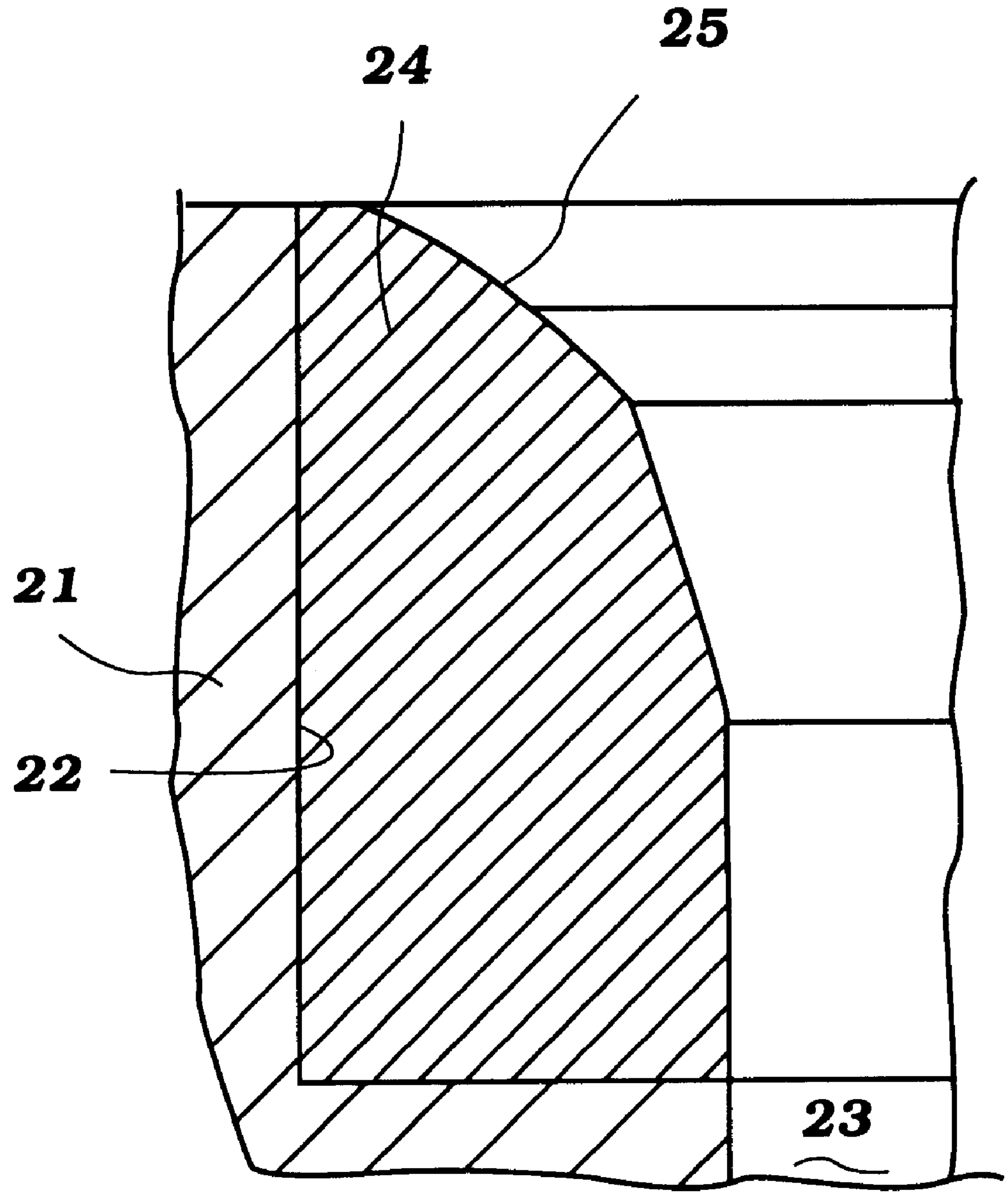
Figure 1 Prior Art
FIG. 1 is an enlarged cross-sectional view taken through a conventional prior art-type pressed in valve seat.
Figure 2:
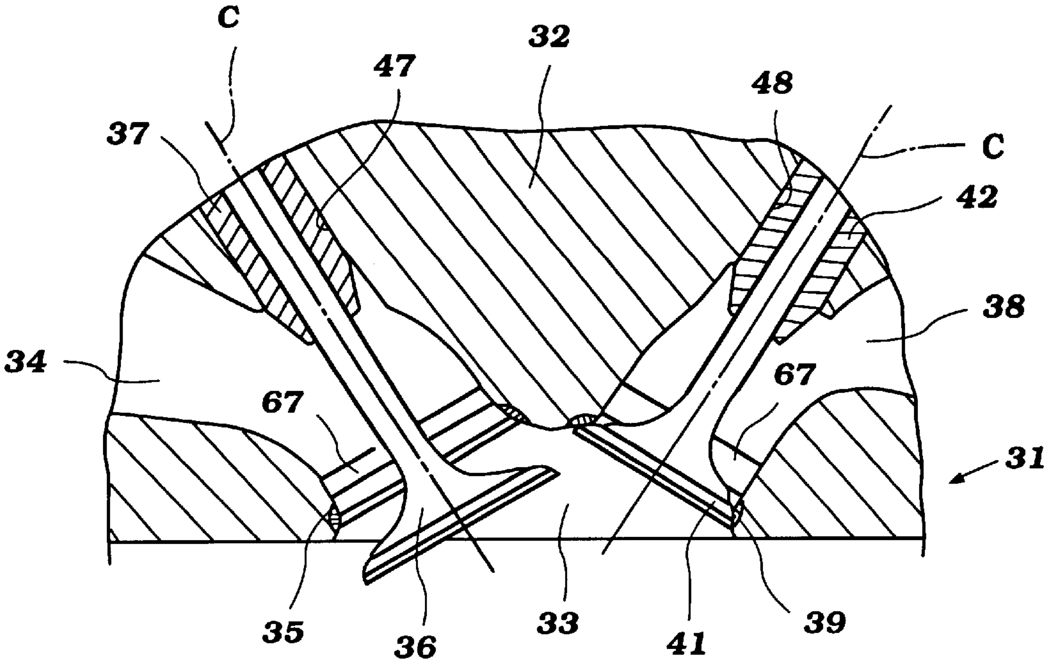
FIG. 2 is a partial cross-sectional view taken through a cylinder head having valve seats formed and constructed in accordance with the invention.

Referring first to FIG. 2, a cylinder head for an internal combustion engine utilizing the invention is identified generally by the reference numeral 31. The cylinder head includes a base cylinder head casting 32 which is formed from an aluminum or aluminum alloy. Such materials are highly desirable for use in engine components and particularly cylinder heads because of their light weight and high thermal conductivity and specific, preferred materials will be disclosed later herein.

The cylinder head 32 as cast is formed with combustion chamber recesses 33 which cooperate with the associated cylinder bore and piston (both of which are not shown) of the associated engine to form its combustion chambers. An intake charge is delivered to these combustion chambers through one or more intake passages 34 that are formed in the cylinder head material 32 and which terminate at valve seat 35 within the cylinder head recess 33. Poppet type intake valves 36 are supported within the cylinder head 32 by valve guides 37 for controlling the opening and closing of the valve seats 35 in a well known manner. The intake valves 36 may be operated by any known type of valve actuating mechanism.

One or more exhaust passages 38 extend from the cylinder head recesses 33 and specifically from valve seats 39 formed therein for the discharge of the combustion products from the combustion recesses 33 in a manner also well known in this art. Exhaust valves 41 are slidably supported in the cylinder head 32 by valve guides 42. These exhaust valves 41, like the intake valves 36 are operated by any known type of mechanism.

When the cylinder head casting is initially made the recesses for the insert rings, which will be described, and which ultimately form the valve seats 35 and 39 are as will be described. In addition, the combustion chamber recesses 33 and other surfaces such as the lower surface of the cam chamber in which the valve operating cam shafts (not shown) are formed so as to provide reference surfaces. These reference surfaces are employed so as to define three mutually perpendicular intersecting reference axes which may be considered to be the X, Y and Z axes for determining the pressing direction and insert location for forming the valve seats 35 and 39, as will become apparent.

Figure 3:
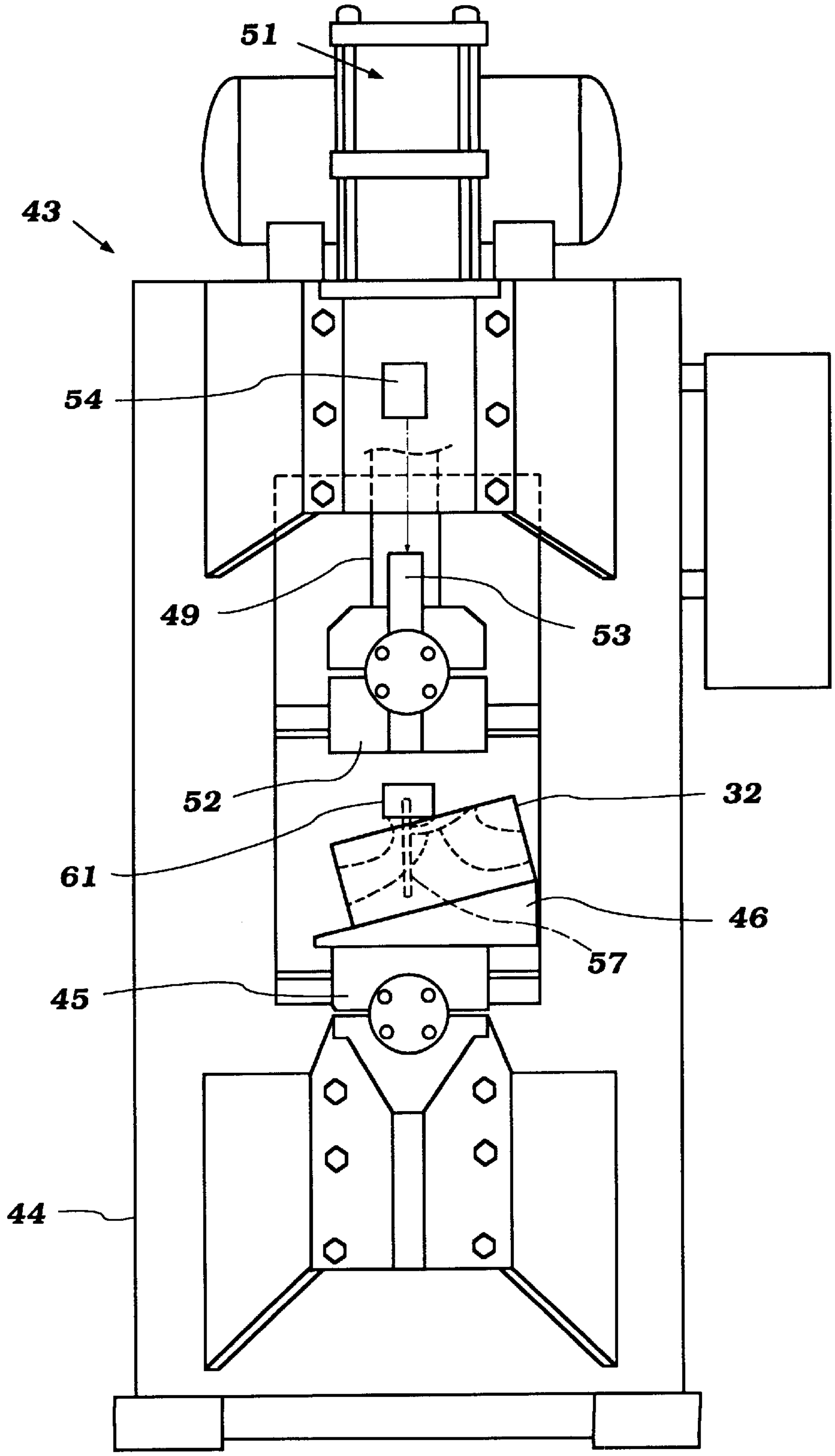
FIG. 3 is a front elevational view of an apparatus for practicing the invention for making bonded valve seats.
Figure 4:
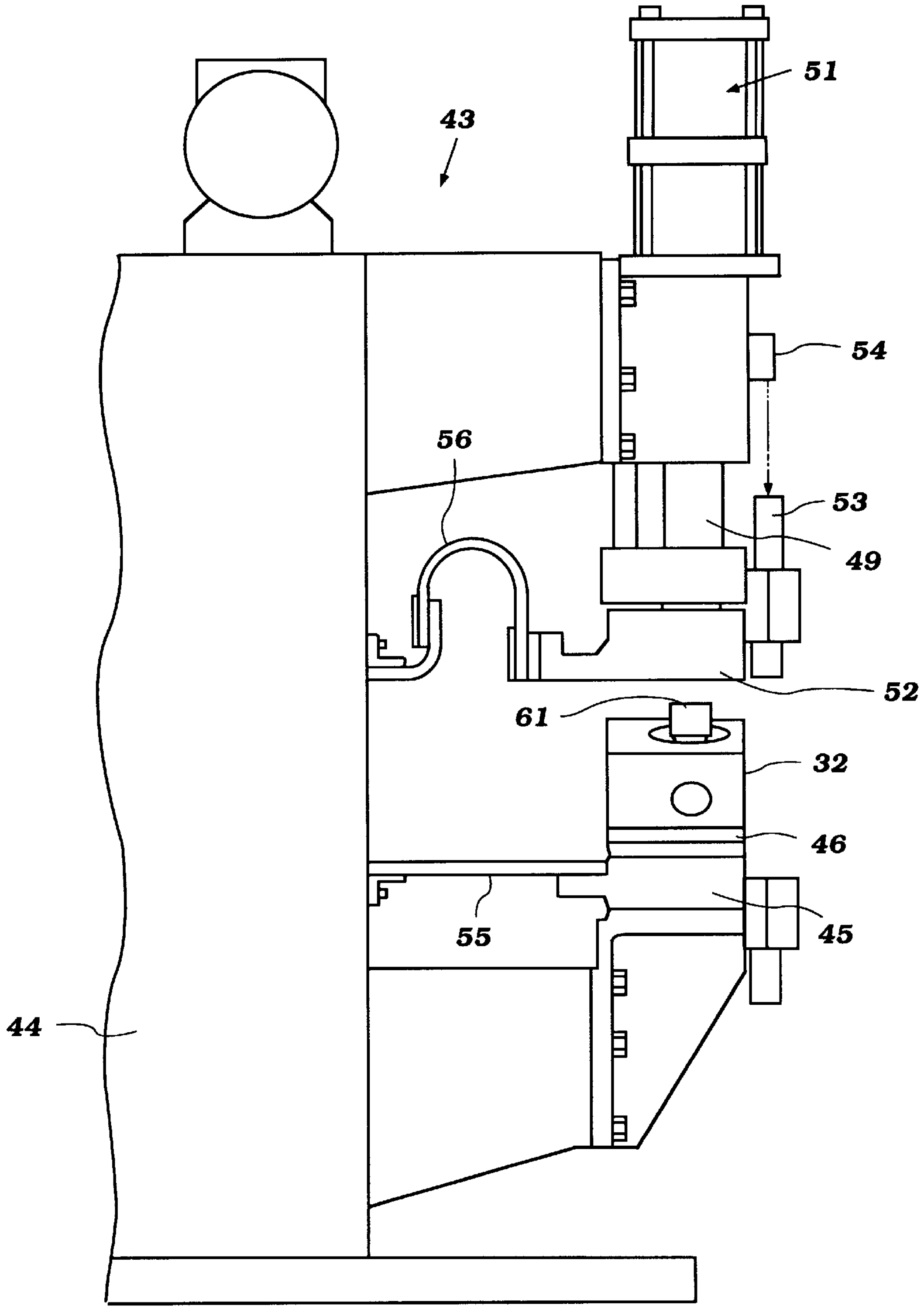
FIG. 4 is a side elevational view of the apparatus.

The invention, as should be readily apparent from the foregoing description, deals in the method in which the valve seats 35 and 39 are formed and the apparatus for performing this method. This apparatus is shown best in FIGS. 3–5 and will be discussed and described by reference to these figures.

The apparatus is indicated generally by the reference numeral 43 and may be considered to be similar to a pressure welding apparatus. However, and as will become apparent, the actual electrical current flow is not sufficient to cause any welding of the insert rings to the cylinder head material.

The apparatus 43 is comprised of a press base 44 that has a support element 45 on which a fixture 46 is mounted so as to accommodate a cylinder head 32. The fixture 46 is disposed so that the cylinder head 32 will be held at an angle. This angle is such that one of bores 47 or 48 (FIG. 2) that received the valve guides 37 or 42 will be in line with the pressing axis of the equipment. The actual axis of the pressing direction is determined by the aforedescribed reference axes defined by the cylinder head casting as also described.

Supported above the table or base 45 is a ram 49 which is driven by a hydraulic or pneumatic motor 51. The ram 49 carries a pressing electrode member, indicated generally by the reference numeral 52.

Affixed to the pressing electrode member 52 is an adjustable post 53 which cooperates with a proximity sensor or detector 54 such as a laser which is utilized to determine the degree of movement during the pressing of the inserts in place and the degree of movement of the ram 49 specifically. The output of this detector 54 indicates the depth at which the insert is pressed into the cylinder head, as will become apparent.

The base 44 carries a source of high energy electricity that is transmitted to the base plate 45 through a first conductor 55 and to the pressing member 52 through a second conductor 56. The conductors 55 and 56 will accommodate vertical movement and the conductor 56 is so configured in this embodiment. The pressing electrode 52 is preferably charged positively and the support base 45 is negatively charged.

The actual pressing apparatus and its association with the cylinder head will now be described by reference FIG. 5. As seen in this figure, a mandrel post, indicated generally by the reference numeral 57, is placed into the valve guide opening 47 of the cylinder head 32. The mandrel post 57 is formed from a central post part 58 that is formed from a suitable material, such as a metallic rod. However, in order to provide electrical insulation, for a reason which will become apparent, the rod 58 is provided with an insulating coating 59. Although the insulating coating 59 may be of any material, a ceramic material, such as alumina, is preferred. The alumina coating 59 is flame sprayed onto the rod base 58 and then is finished by polishing.

A stopper ring 60 is affixed to the mandrel 57 and contacts the inner surface of the cylinder head intake passage 34 around the valve guide opening 47 so as to limit how far the mandrel post 57 extends into the valve guide opening 47.

A further pressing member, indicated generally by the reference numeral 61, is provided with an opening 62 complementary in shape to the mandrel and is slid thereover. The pressing member 61 has an actual pressing surface that is formed by a hardened body 63 formed from an appropriate material and which either is magnetized or which carries a magnetic body 64 so as to attract and hold an insert ring 65 thereupon. The body surface 63 is formed with a tapered end 66 that is complementary to the shape of the insert ring 65, as will be described later by reference to FIG. 6. Because the pressing body 61 is engaged the electrode 52, electrical current will flow through the pressing body 61 and through the insert ring 65. As will become apparent later, when the insert ring 65 is engaged with the cylinder head 32, an electrical path will be formed through the cylinder head and base 45 to the conductor 55 to complete the electrical path. The insulated coating 59 on the mandrel 57 prevents short-circuiting around this area.

Figure 6:
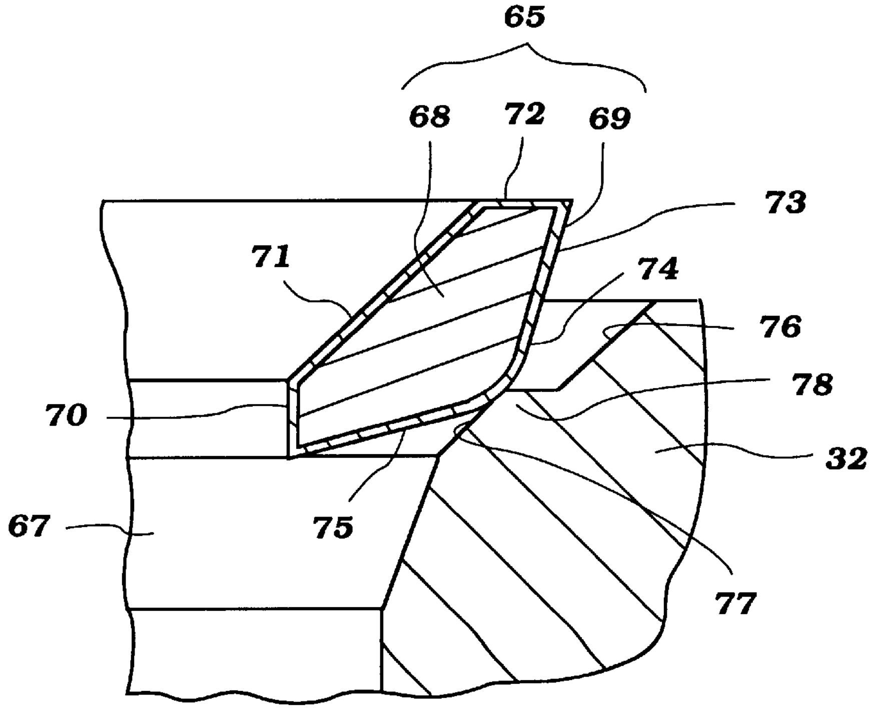
FIGS. 6–10 are step-by-step cross-sectional views showing the steps in pressing in and bonding a valve seat insert in accordance with the invention with FIG. 7 showing the initial step and FIG. 11 showing the final machined valve seat.

The construction of the insert ring 65, its shape and the shape of a cooperating recess 67 formed in the cylinder head at the mouth of the intake passage 34 will now be described by primary reference initially to FIG. 6. FIG. 6 is an enlarged crosssectional view of one of the intake valve seats 35 and this description may be considered to be typical for that which may be utilized with the exhaust valves 41 to form the exhaust valve seats 39.

Basically, the valve seat 35 is formed by the insert ring, indicated by the reference numeral 64 and which has a metallurgical construction as will be described. This insert ring 64 is bonded to the cylinder head material 32 by a relatively thin metallurgical bonding layer that is formed in a manner which will be described. Adjacent this bonding layer, there is formed a portion of the material of the cylinder head 32 which has been plastically deformed. It should be noted that the alloy of the cylinder head 32 is of the same chemical composition and same physical structure, except for being slightly work hardened in the area adjacent the bonding layer, as in the remainder of the cylinder head material 32.

The insert ring 64, is formed from a Sintered ferrous alloy base 67 having a coating material filled within its intercices and also on its external surface as desired, which coating is indicated at 68. This material is preferably formed from a good electrical conductor such as copper. Copper also has another useful function as a coating for a reason to be described.

The insert ring 64 in accordance with this embodiment is formed with a cylindrical inner surface 69 that is relatively short in axial length and which merges into a tapered conical surface 71 which extends for a substantially length. The surface 71, which is actually the pressing surface, as will be described, ends in an end surface 72.

A first, conical outer surface section 73 extends at an acute angle to the axis of the cylindrical section 69 and merges at a rounded section 74 into an inclined lower end surface 75 which is formed at a greater angle than that of the conical surface 73. However, this angle is still an acute angle to a plane perpendicular to the axis of the cylindrical section 69.

The cylinder head material 32, preferably as cast, is formed with a recess that is comprised of a first section 76 that is connected to a second section 77 that are joined by a horizontal surface that forms a projecting ledge 78 that contacts the rounded portion 74 of the insert ring 64 upon initial installation (FIG. 6). This tends to form a localized area that will begin the plastic deformation phase.

It has been noted that the copper coating serves the function of improving the electrical conductivity of the insert ring 64. Also, it has been noted that the copper performs additional functions. As should be apparent from the foregoing description, it is important that the bonding process not result in any alloying of the insert ring material and specifically that of the base 67 with the base material of the cylinder head 32.

The copper also serves the function of forming a eutectic alloy with the material of the cylinder head 32 which eutectic alloy has a lower melting point than either the melting point of the copper or that of the cylinder head material. As a result, the plastic deformation is accomplished with added ease and the metal can flow out during the pressing process as will be noted without large heat generation. In addition, the copper will react with any aluminum oxides that may be present on the surface of the recess 66 of the cylinder head 32 so as to extrude these oxides and provide a purer finish.

Preferably, the copper plating is done by electroplating and has a thickness in the range of 0.1–30 μm. Also, the cylinder head material of the body 32 is preferably an aluminum alloy as set forth in Japanese Industrial Standard (JIS) AC4C. Also the AC4B and AC2B aluminum alloys or other light alloys may be utilized.

Beginning now to describe the pressing operation by reference to FIGS. 6–10. FIG. 6 shows the conditions comparable to that in FIG. 5. The pressing force is then applied by actuating the hydraulic ram operating motor 51 so as to move the electrode 52 into contact with the pressing mandrel electrode 59. Prior to this the mandrel 59 may be rotated to ensure that the insert ring 64 is correctly seated.

Figure 11:
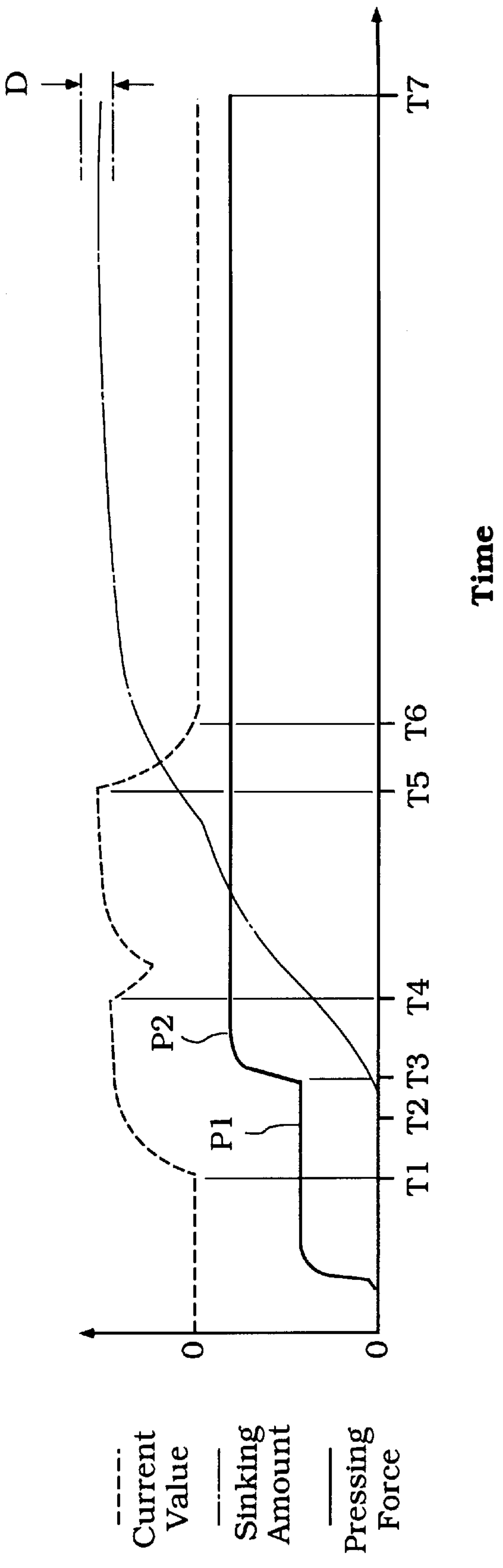
FIG. 11 is a graphical view showing pressing force and electric current flow in accordance with a preferred method of practicing the invention to achieve a bonded valve seat.

A pressing force is then applied at a force indicated at the force P1 in FIG. 11. This force acts along an axis defined as noted based upon the three reference axes determined from the reference surfaces of the cylinder head casting. This pressing axis will be coincident with the final axis of the seat. Pressure is maintained up until the time T1 wherein an electric current flow through the joint is initiated. When this occurs, there will be a high electrical resistance due to the small contact area and a plastic deformation begins in the range indicated at A in FIG. 7 so as to displace the material of the cylinder head 32.

Figure 7:
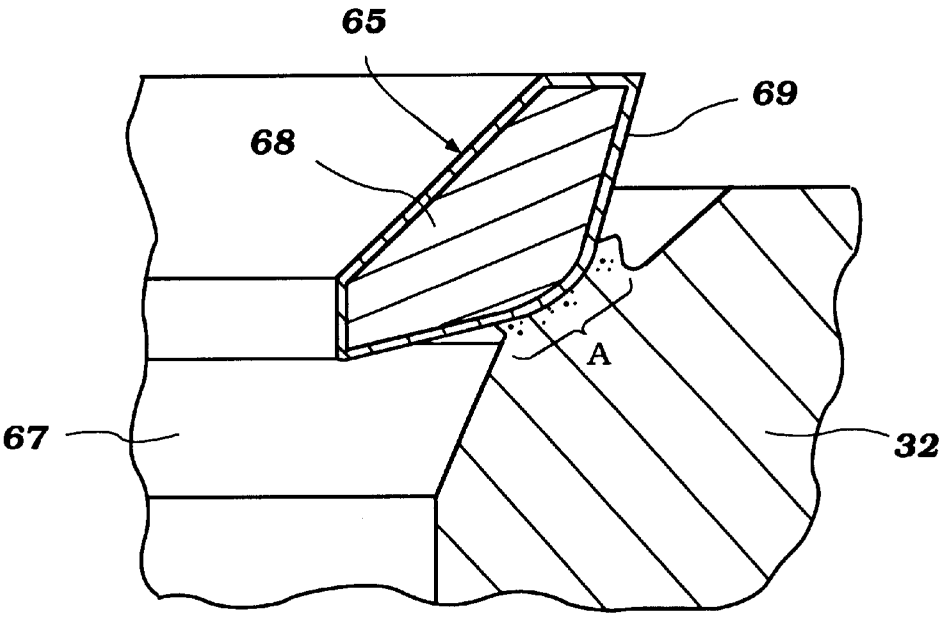

As the current is built up, the material will reach a temperature wherein the internal resistance is high enough to cause the copper coating layer 74 to defuse into the cylinder head material in the area 78 or shown in the range A so as to form the eutectic alloy that results in the area indicated at A in FIG. 7 and which eventually causes displacement and a plastic deformation and the valve seat 64 will begin to become embedded in the material of the cylinder head 32.

Figure 8:
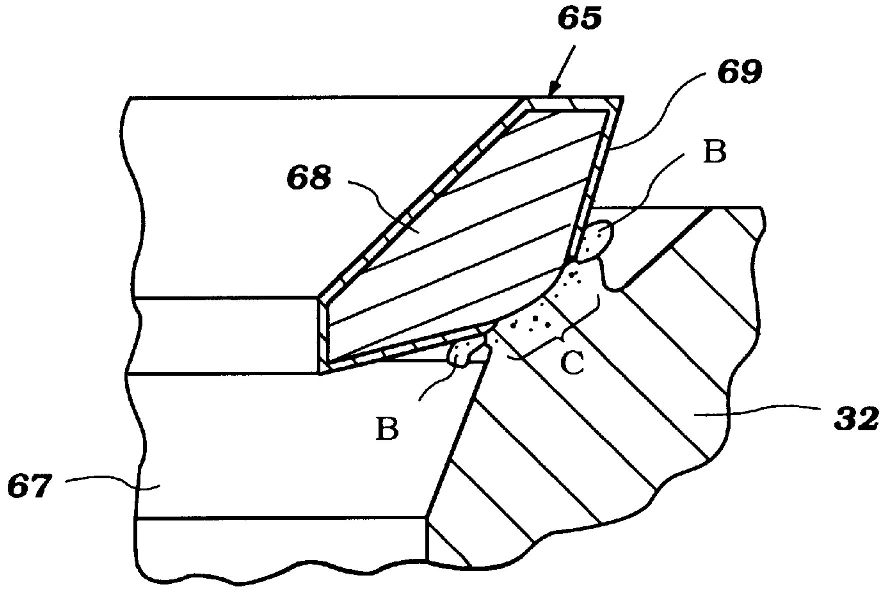

The eutectic layer is displaced as indicated at B in FIG. 8 toward the area which will be removed from where the final valve seat will be formed. Said another way, this material will be later machined away.

The actual deformation of the insert into the cylinder head body, as measured by the sensor 54, begins at the point in time T2. At some time thereafter, the electric current will have reached its maximum amount at the first level at the point T3 and then the pressing pressure is increased from the pressure P1 to a new higher pressure P2 which is then held.

This plastic deformation then continues and after a certain deflection and at the time period T4, the electric current is reduced sharply toward zero as shown in FIG. 11. This is done to avoid overheating and to ensure that there will be no alloying of the insert ring material and that of the cylinder head material. There will, however be atomic diffusion of the materials in the area C.

Figure 9:
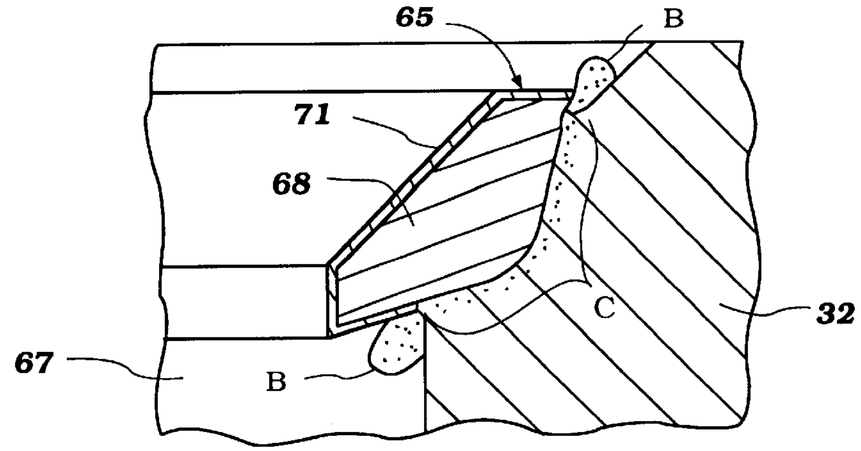

The electric current is then built up higher to a new level equal to or slightly higher than that before and is held at this level until the point in time T5. This pressing is continued after this still at the pressure P2 during which time period the current flow is dropped back to zero at the time period T6 while pressing is continued. The final joint appears as shown in FIG. 9 and it will be seen that substantially all of the eutectic alloy has been pushed from the area between the insert base 67 and the base cylinder head material resulting in only the work hardened adjacent the joint and atomic bonding in the area C. In addition, the metallurgical bonding will be completed.

During this time and after the completed bonding, the apparatus measures the amount of actual embedding of the insert ring 67 into the cylinder head 32. There is an allowable range as indicated by the dimension D in FIG. 11 which range is about 0.5 millimeters to 2 millimeters and preferably in the range of 1 to 1½ millimeters. If the sinking level is not reached in this range, then it can be assumed that the joint is not satisfactory. This judgment may also be made during the actual pressing, bonding operation. If the deflection is not in the proper range, the process may be discontinued.

In addition, a judgment may be made whether the main current values and total energization time are in the allowable range. If this is also met, then certain cylinder head valve seats may be actually pull testing to assure accuracy and satisfaction of the entire lot of cylinder head formed.

The way this testing is done is that a tensile force is applied by putting an appropriate fixture under the projecting edge of the insert ring as shown in FIG. 9 and applying a pulling force. This way, the actual force necessary to separate the bonded joint can be measured. If the samples are within the predetermined range, then it can be assumed that all heads in the lot, which have also passed the other test, are satisfactory.

In addition to these tests, there can be a heat endurance test and/or heat shock test applied to the finished cylinder head. All of these things are done before the final machining.

The heat endurance test is performed on the cylinder head in the state shown in FIG. 9. The head is kept in a furnace at 300° C. and atmospheric pressure in the range of 24 to 200 hours. A further pulling test is then performed and the area inspected for separation or cracks. In a heat shock test, the finished cylinder head in the condition shown in FIG. 9 is heated to 300° C. in a furnace at that temperature and atmospheric conditions. The thus heated head is then immediately immersed in ice water at 0° C. This procedure is repeated ten times and then the cylinder head is checked for separation and cracks and the separation test aforenoted is performed.

Figure 10:
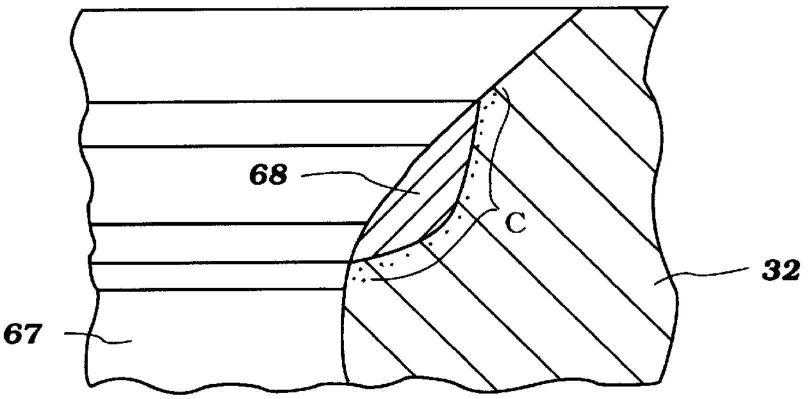

Assuming that the tests indicate that the head lot is satisfactory, then the heads are finish machined by grinding or the like to the conditions shown in FIG. 10. Thus, it will be seen that all of the eutectic alloy phase B is removed and only the metallurgical bonding area C remains. The finished joint has no melt reaction layer or no actual alloying between the cylinder head material and that of the insert ring.

A visual inspection is also made after the bonding is completed. In this inspection it is checked to see that the eutectic alloy portion B (FIG. 9) extends around the entire insert without voids. If not the piece should be rejected as the bond may have voids.

Figure 12:
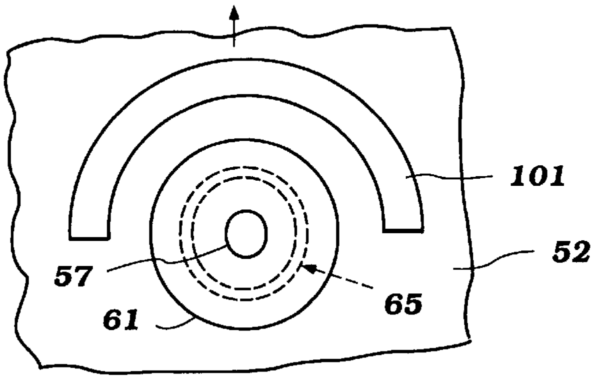
FIG. 12 is a top plan view showing a shield device that can be utilized with the pressing electrode to control the direction the eutectic alloy is removed from the bonded portion.

FIG. 12 shows another embodiment of the invention and in this embodiment the electrode 52 of the pressing head is provided with a ferrous semi-circular shield 101 which functions to provide a magnetic flux in the magnetic field which directs the eutectic alloy that is removed from the bonded area. This can be done so as to ensure that more of the eutectic alloy is disposed in the area where the most machining will occur so as to minimize the amount of machining necessary. Also this is done to insure complete bonding around the joint.

The actual process by which the axis of the pressing force is operated and certain alternative pressing methods will be described by first reference to FIG. 13. At the step S1, the cast working reference planes of the cylinder head are utilized to define the aforenoted reference axes. From these axes are located the desired axis of the cylinder head recess that will receive the individual valve seat and also the axis location of the valve guide opening 47 which is, in accordance with a preferred embodiment of the invention, coaxial with the cylinder head recess. The axis of pressing is also determined in this same manner.

Then, at the step S2 the valve seat insert receiving recess is machined and at the step S3 the cylinder head valve guide opening 47 is machined. Although these machining steps are described as separate steps, the machining may be performed at substantially the same time by a single compound tool.

Figure 5:
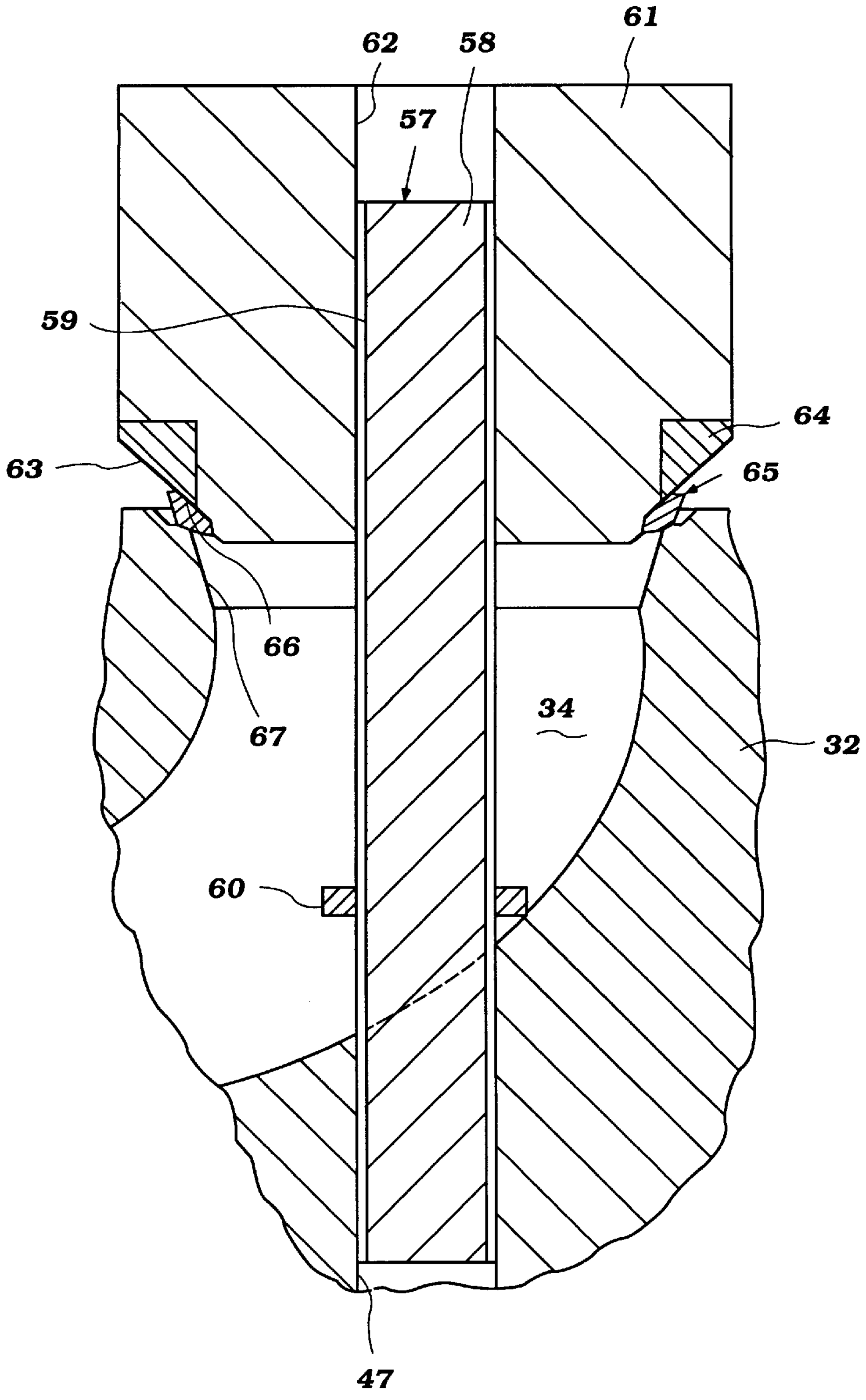
FIG. 5 is an enlarged cross-sectional view showing the apparatus in position for forming the bonded valve seat.

The valve seat insert ring 64 is then placed in position at the step S4, this being the position described in conjunction with FIGS. 5 and 6 previously.

If desired, a washing step may precede this at the step S5 although this is alternative. This washing may either be done with a fluid or a merely an air pressure cleaning.

At the completion of step S4, the pressing operation previously described in conjunction with FIGS. 6–9 is performed in the manner then described.

Subsequently at the step S7, the actual valve guide is press-fit into position. In order to assist the press-fitting, either the cylinder head may be preheated and/or the valve guide may be chilled as seen at the step S8.

After the valve guide is pressed into position at the step S7, at the step S9 there is a rough machining of the valve seat and then at the step SiO there is the final machining of the valve seat surface.

The program then moves on to succeeding processes such as the machining of the bearing surfaces for the cam shafts and other machining operations which may be required.

Figure 13:
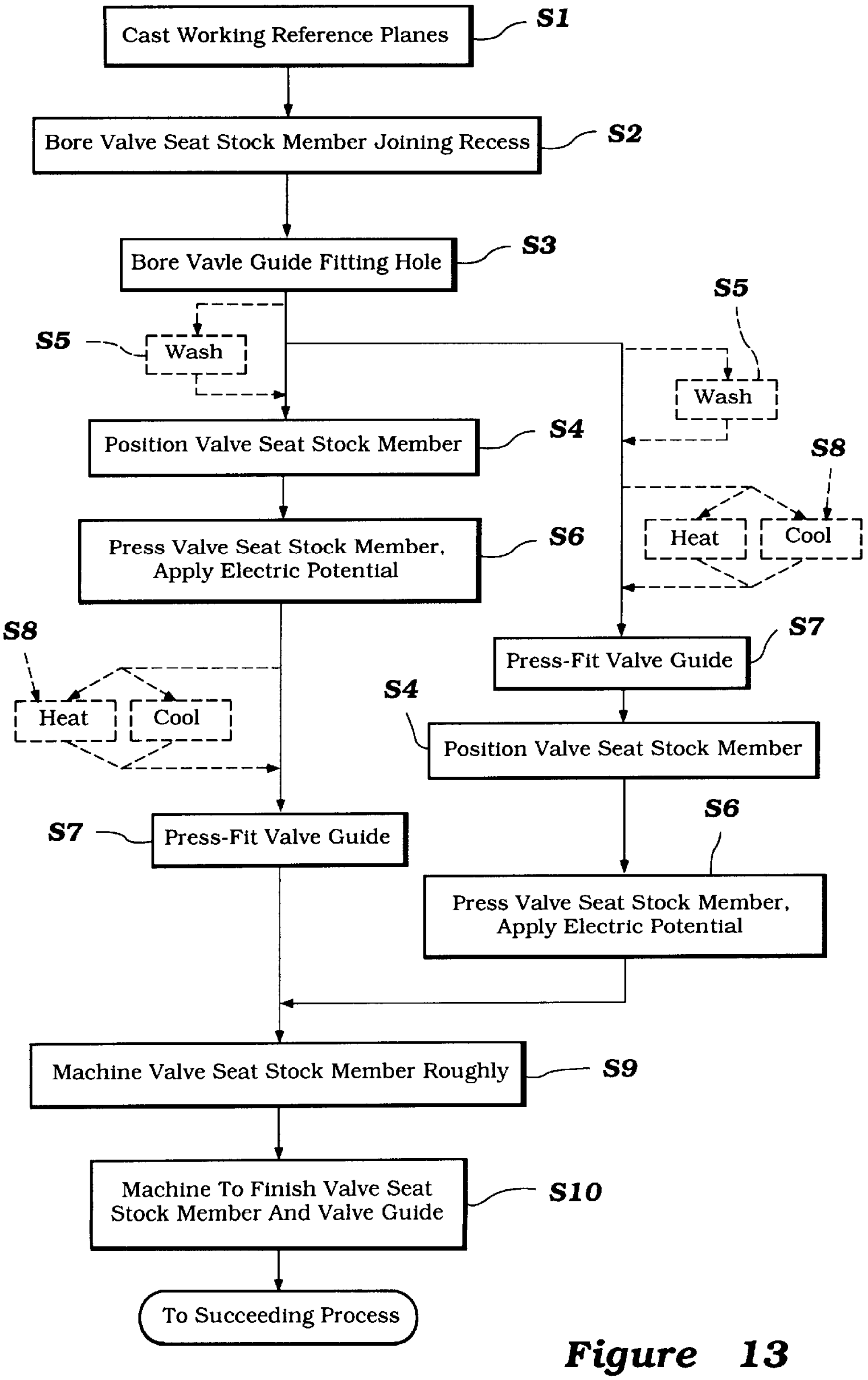
FIG. 13 is a diagrammatic view showing the processing steps by which a valve seat may be formed in accordance with first and certain alternative methods embodying the invention.

FIG. 13 also shows an alternative method for bonding the valve seat inserts into place. This method involves the use of the valve guide itself as the support for the pressing mandrel. In accordance with this method, at the step S3 the program then may move to the desired washing step at S5 and subsequently the heating and/or cooling step at S8 may be employed so as to perform the pressing in of the valve guide at the step S7.

Then, the program may move to the step S4 so as to position the valve seat insert and to the step S6 so as to press in the valve seat insert and achieve the bonding as previously described in conjunction with FIGS. 5–9.

Figure 14:
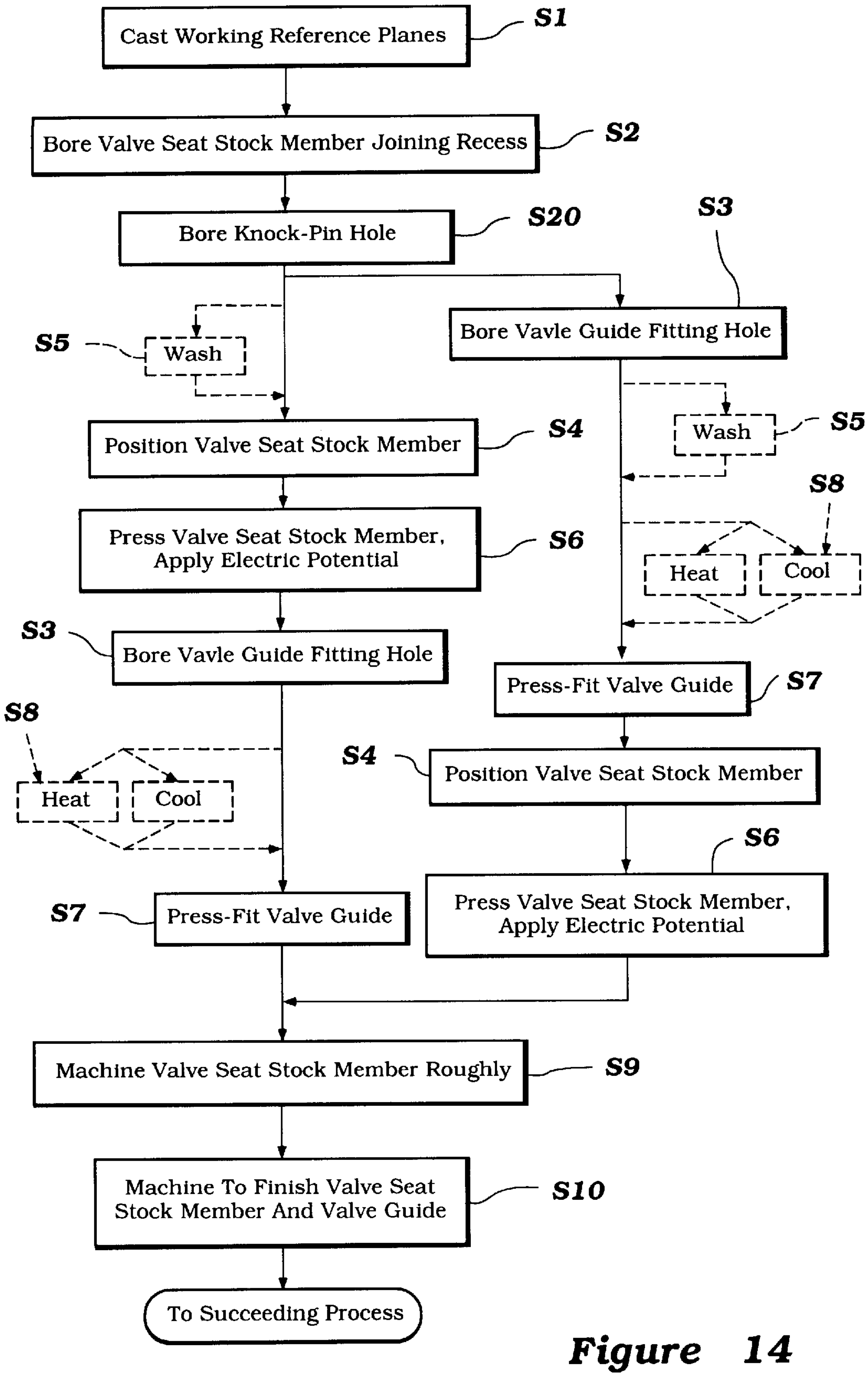
FIG. 14 is a block diagram, in part similar to FIG. 13 and shows other alternative methods for forming a valve seat in accordance with the invention.

In the methods described in conjunction with FIG. 13, the actual pressing axis has been defined by the formation of the valve guide receiving recess 47 in the cylinder head. However, the pressing axis may be defined by another bored or machined hole in the cylinder head and FIG. 14 shows such a method.

In this method, the program again starts at the step S1 so as to define the reference axes. From these axes, then the valve seat receiving recess is machined at the step S2. A further machined hole in the cylinder head such as a knock-out pin hole is formed at the step S20. From this step the program can then move to the step S4 so as to position the valve guide insert and to press and bond it into place at the step S6. As previously mentioned, if desired, a washing operation may precede this at the step S5.

After the valve seat insert is bonded at the step S6, the program then moves to the step S3 so as to bore the final opening 47 to receive the valve guide. The valve guide is then pressed in place at the step S7. As previously described, the pressing in of the valve guide may be preceded by heating of the cylinder head and/or cooling of the valve guide at the step S8.

Once the valve guide is positioned, then the rough machining steps S9 and final machining steps S10 for the valve seat surface may be performed.

This routine shown in FIG. 14 may also employ an arrangement wherein the valve guide is pressed in place before the valve seat insert is pressed in place. This routine follows the alternate path also shown in FIG. 13. If this methodology is followed, then the valve guide receiving hole 47 of the cylinder head is machined at the step S3 after the completion of the boring of the knockout pin hole at step S20. The routine then continues through the alternate steps S5, S8, and the steps S7, S4, and S6 in that order as shown and described in conjunction with FIG. 13. Because of the fact that this method is the same as that described in conjunction with that figure, a further description of this embodiment is not believed to be necessary.

In the embodiments thus far described, it has been assumed that the recess in the cylinder head to receive the inserts must be machined. In accordance with the methodology that is employed it may not be necessary to machine these recesses and thus further time and cost savings can be generated. This is primarily possible because of the fact that the pressing operation and the use of the mandrel can be employed in order to form the desired location for the valve seat insert rather than relying on the recess to perform this function, as in the prior art pressed in insert methods.

Referring to this figure, the initial step indicated at S1*a* is performed which includes not only the casting of the working reference plane so as to define the reference axes but also to cast the desired valve seat recess configuration and location. Thus, after this is accomplished then at the step S4 the valve seat insert may be placed and subsequently pressed and bonded at the step S6 in the manner as previously noted.

Then, the program moves to the step S3 so as to form, as by boring, the cylinder head recess 47 that will receive the valve guide.

The valve guide is then pressed in place at the step S7 with, if desired, the preceding heating of the cylinder head and/or cooling of the insert at the step S8.

The rough and finish machining of the valve seat insert are then performed at the steps S9 and S10, respectively.

Figure 15:
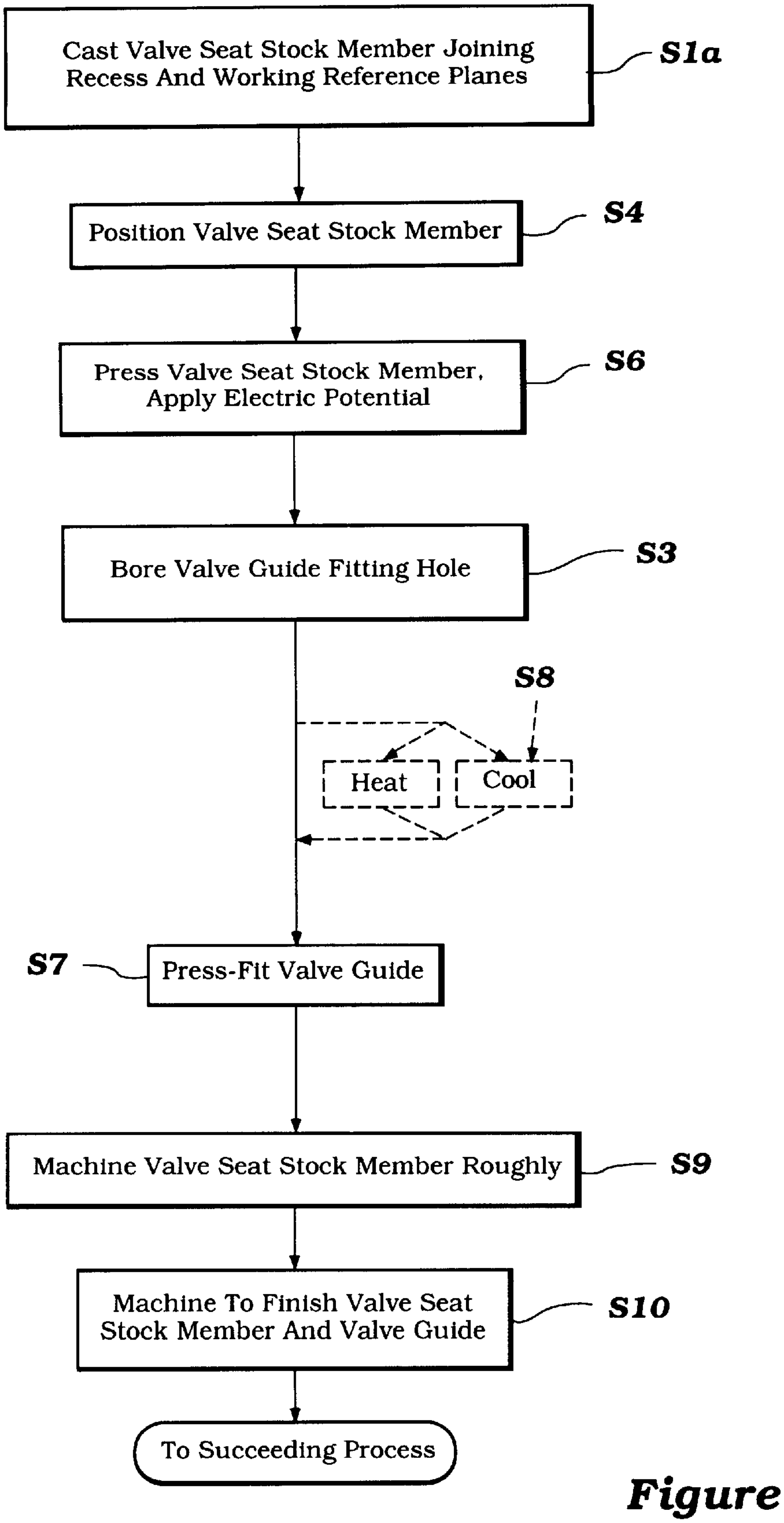
FIG. 15 is a block diagram, in part similar to FIGS. 13 and 14 an shows still further methods by which a valve seat may be formed in accordance with the invention.
Figure 16:
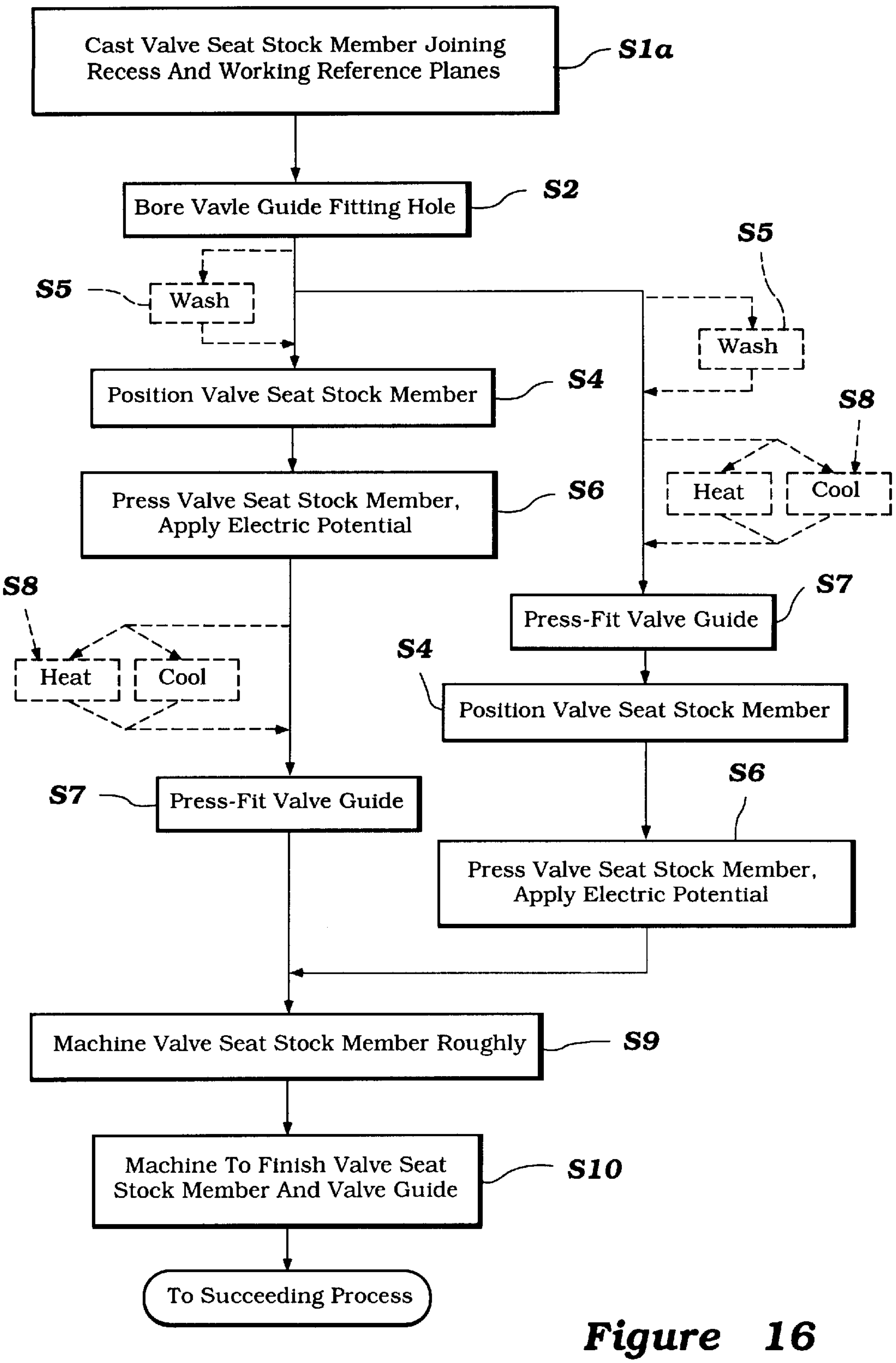
FIG. 16 is a block diagram, in part similar to FIGS. 13–15 and shows yet further methods by which the valve seat may be formed in accordance with the invention.

FIG. 16 shows another methodology by which the inserts may be bonded in place. This methodology follows generally the embodiments shown in FIG. 13 and where that is the case the steps have been identified by the same reference numerals and will not be described again. However, in accordance with this embodiment, the valve seat insert receiving recess of the cylinder head is also not machined like the embodiment shown in FIG. 15. Thus the program begins at the step S1*a* wherein the reference surfaces and recess are formed in the cylinder head by casting. In this embodiment, however, like the embodiment of FIG. 13, the program the moves to the step S2 so as to bore the recess 47 in the cylinder head to receive the valve guide.

The program then continues on with the steps as shown in FIG. 13 or the alternatives thereof. Therefore, these steps and their sequence will not be repeated again.

Figure 17:
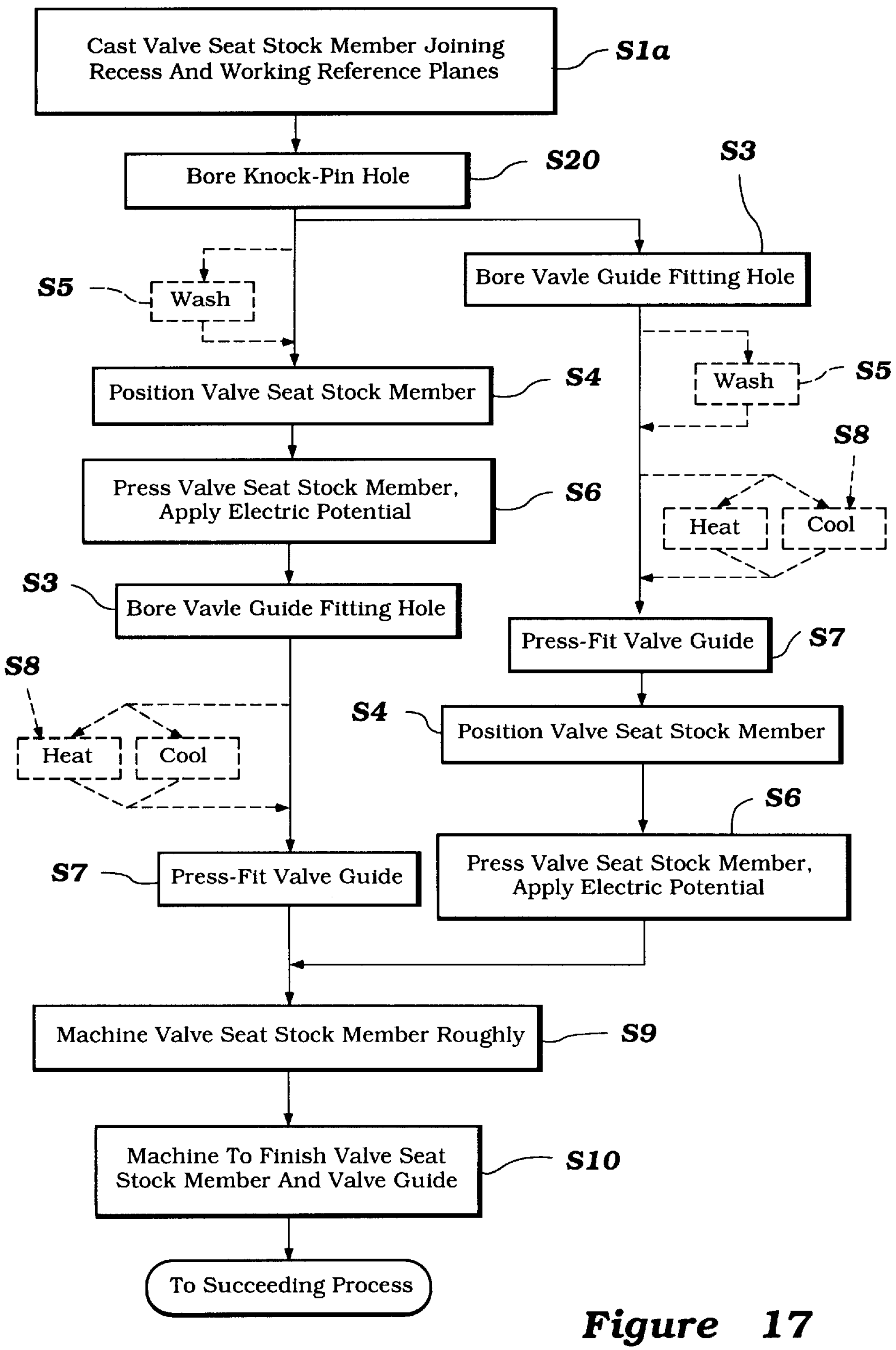
FIG. 17 is a block diagram, in part similar to FIGS. 13–16, and shows yet further methods by which the valve seat may be formed in accordance with the invention.

FIG. 17 shows a routine which, like the embodiments of FIGS. 13 and 16 begins at the step S1*a* so as to form as cast the cylinder head recess to receive the valve seat insert. However, this embodiment also employs the use of another hole in the cylinder head than the valve guide receiving hole for locating the components and thus follows the alternate control routine shown in FIG. 14 beginning with the step S20. Again, since the steps and their order follow from this point that of the embodiments shown in FIG. 14, this description will not be repeated.

Figure 18:
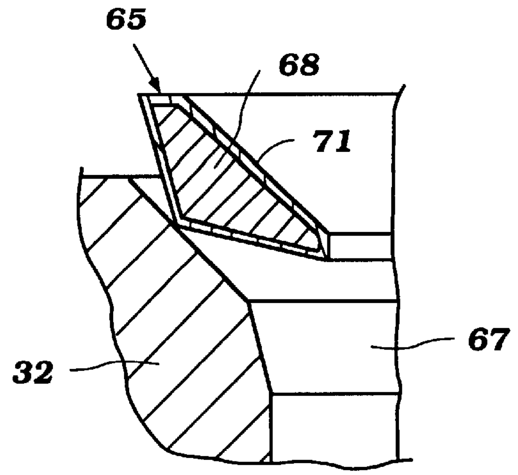
FIG. 18 is a cross-sectional view, in part similar to FIG. 6, and shows another configuration that may be employed for the insert and cylinder head.
Figure 19:
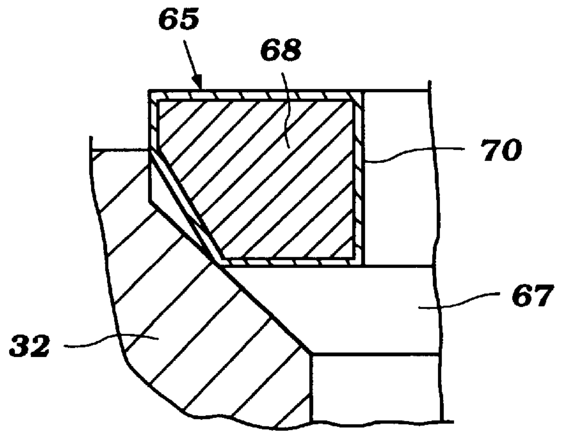
FIG. 19 is an enlarged cross-sectional view, in part similar to FIGS. 6 and 18, and shows yet another configuration which may be employed for the insert and the cylinder head recess.
Figure 20:
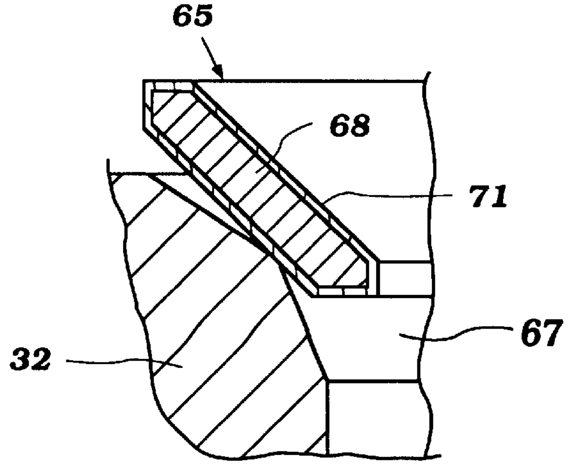
FIG. 20 is a cross-sectional view, in part similar to FIGS. 6, 18 and 19, and shows a still further configuration of insert that may be employed.

In the foregoing description, a specific shape of insert and cylinder head recess has been depicted and described. The insert and recess may take different configurations as shown in FIGS. 18–20. FIG. 18 shows a configuration similar to that of the previous embodiment, but the cylinder head recess is merely formed with a simple taper. In addition, the insert is not rounded, but the bonding operating will begin at a small area as in the previously described embodiment.

FIG. 19 shows another embodiment using a different shape ring and that lends itself to what is called end pressing. However, the shape of the insert ring is again such that the initial deformation of the cylinder head will begin at the middle of its tapered area. In addition, an outer peripheral groove will assist in locating.

FIG. 20 shows a simplified form of shape of insert ring that adapts itself to the pressing method which can be utilized with all of the embodiments of FIGS. 1–17. Again, however, the arrangement is designed so as to ensure localized initial deformation. Also, each of these embodiments are designed so as to provide the desired length of bonding surface to provide the desired bonding strength. Also, although a specific cylinder head material and insert material have been disclosed, various other materials may also be practiced.

Thus, from the foregoing description it should be readily apparent that the described pressing and bonding methods provide very effective valve seats that will eliminate sacrifices in strength and port configuration over conventional methods. In addition the manufacturing process is simplified and the cost reduced. Furthermore because of better heat transfer, lighter weight valves can be utilized and larger valve areas can be employed so as to increase the performance of the engine without shortening its life. Of course, the foregoing description is that of the preferred embodiments of the invention, and various changes and modifications may be made without departing from the spirit and scope of the invention, as defined by the appended claims.

What is claimed is:

1. A method of forming a valve seat for a cylinder head having a flow passage ending in a combustion chamber recess, a poppet type valve cooperates with the valve seat and has a stem portion supported in the cylinder head comprising the steps of casting a cylinder head having a flow passage, forming the cast cylinder head with reference surfaces used to establish three mutually perpendicular reference axes that intersect at a common point, forming a recess at the combustion chamber side of the flow passage, forming an insert to be received in the recess, the insert having an opening adapted to form a flow opening registering with the cylinder head flow passage and an outer surface positioned to engage the part of the cylinder head defining the recess, forming a valve guide bore in the cylinder head at the flow passage, inserting an electrically insulated mandrel at least in part into the valve guide bore from the combustion chamber side thereof, said mandrel defining the pressing axis, placing the insert around said mandrel and in alignment with said recess, placing a pressing member upon said mandrel and in engagement with said insert in a manner to prevent movement of the insert transversely to the pressing axis, applying pressure to the cylinder head and the insert through said pressing member for forcing said insert along the pressing axis into said recess and confining the relative movement of the cylinder head and the insert to occur only along the pressing axis through the cooperation of said pressing member with said insert, and passing an electrical current through the pressing member, the insert and the cylinder head during at least a portion of the pressing operation to heat the cylinder head and form a metallurgical bond between the cylinder head and the insert.

2. A method of forming a valve seat as set forth in claim 1, wherein the recess formed at the flow passage is formed during the casting operation.

3. A method of forming a valve seat as set forth in claim 1, wherein a valve guide is pressed into the bore after the valve seat is bonded in place.

4. A method of forming a valve seat as set forth in claim 1, wherein a valve guide is pressed into the bore before the valve seat is bonded in place and the mandrel is inserted into the valve guide.

5. A method of forming a valve seat as set forth in claim 1, wherein the recess formed at the flow passage is machined after the casting operation.

6. A method of forming a valve seat as set forth in claim 1, wherein the amount of electrical current flow through the insert is insufficient to melt the material of the cylinder head in the area of current flow.

7. A method of forming a valve seat as set forth in claim 1 wherein the cylinder head is formed from a first material and the insert is formed from a second material, different from the first material.

8. A method of forming a valve seat as set forth in claim 7, further including providing a coating material between the insert and the cylinder head which is of a different material that either insert and the cylinder head.

9. A method of forming a valve seat as set forth in claim 8, wherein the coating material is formed on the insert prior to its being pressed into the cylinder head.

10. A method of forming a valve seat as set forth in claim 9, wherein the electrical current is applied at a first amount for a first time and then is decreased and subsequently increased for a second time.

11. A method of forming a valve seat as set forth in claim 10, wherein the pressure applied is held at a first value until a predetermined time before the electrical current flow is increased the second time.

12. A method of forming a valve seat as set forth in claim 1, wherein the cylinder head reference surfaces comprise a combustion chamber recess and a cam chamber surface.

* * * * *